United States Patent

[11] 3,576,048

| [72] | Inventor | Donald B. Stanley |
| | | Blue Springs, Mo. |
| [21] | Appl. No. | 824,867 |
| [22] | Filed | May 15, 1969 |
| [45] | Patented | Apr. 27, 1971 |
| [73] | Assignee | Industrial Plastic Corp. |
| | | Grain Valley, Mo. |

[54] RIDER BAR PLATEN SUPPORT FOR BLOW MOLDING MACHINES
10 Claims, 3 Drawing Figs.

[52] U.S. Cl. .................................................... 118/5,
18/30
[51] Int. Cl. .................................................. B29c 1/16
[50] Field of Search .......................................... 18/5 (BO),
5 (BP), 30 (LM), (Inquired)

[56] References Cited
UNITED STATES PATENTS
3,279,004  10/1966  Hartman et al. ............... 18/30

FOREIGN PATENTS
236,985  8/1959  Australia ..................... 18/5BO

*Primary Examiner*—Leonidas Vlachos
*Attorney*—Schmidt, Johnson, Hovey & Williams ABSTRACT: A support assembly for the shiftable platen of a blow molding machine designed to eliminate structure between the platens or molds of the molding machine, the support assembly including a rider bar having one end connected to the shiftable platen whereby the bar is shifted with the platen, there being a roller carried by the frame of the molding machine and in underlying engagement with the bar to support the same as it is shifted with the platen and a wheel carried by the free end of the rider bar, the wheel engaging the frame as the bar is shifted, all with the result that the platen and mold carried thereby are supported as the same are shifted into a molding position without the necessity of structure at the center of the mold.

PATENTED APR 27 1971

3,576,048

INVENTOR
Donald B. Stanley

BY Schmidt, Johnson, Hovey,
Williams & Chase
ATTORNEYS

RIDER BAR PLATEN SUPPORT FOR BLOW MOLDING MACHINES

It is a most important object of this invention to provide a support assembly for the shiftable platen of a blow molding machine, which support assembly is positioned in such a way as to not interfere with the area between the molds of the machine, all to the end that access may be freely gained to said area whereby to facilitate the molding of larger articles and also access to the molds and other components of the machine for maintenance and repair purposes.

Another important aim of this invention is to provide, in such a support assembly, a rider bar having one end thereof connected to the shiftable platen of the blow molding machine, whereby the bar is shifted with the platen, the other end of the rider bar carrying a wheel which extends above the upper face of the bar and into engagement with the frame whereby to move therealong when the bar is shifted; there being a roller carried by the frame by a pair of depending hangers, the bar passing between the hangers and over the roller whereby the roller serves to support the bar as the lower face thereof moves therealong when the platen is shifted.

Other important objects of this invention include the manner in which the rider bar is bifurcated at the other end thereof to rotatably carry the wheel which is in engagement with the frame; the manner in which the hangers which carry the roller which is in engagement with the lower face of the rider bar depend from a mounting plate which is secured to the frame; the provision of a pair of guide rollers in engagement with corresponding sides of the rider bar; and other details of construction which will become apparent from the following specification and accompanying drawing wherein.

Figures 1, 2, 3:
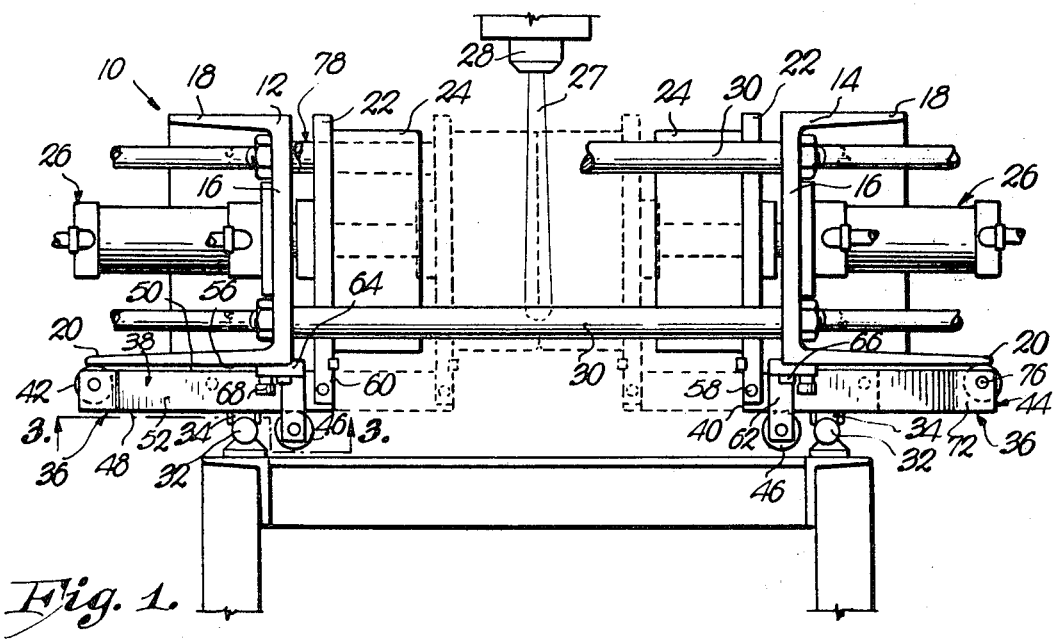
FIG. 1 is a fragmentary front elevational view of a blow molding machine incorporating the rider bar platen support.
FIG. 2 is a side elevational view thereof.
FIG. 3 is a view taken on line 3–3 of FIG. 1.

The blow molding machine 10 chosen for purposes of illustration is conventional in nature in that it includes a pair of opposed, fixed frames 12 and 14, the frames in this particular instance being channel shaped whereby to each present a bight 16 and a pair of outwardly extending legs 18 and 20. A shiftable platen 22 is associated with each of the frames 12 and 14, the platens each receiving a suitable mold such as 24 and being shiftable by means of a piston and cylinder assembly 26 which is conventionally coupled with the platen whereby to reciprocate the opposed platens 22 and their corresponding molds 24 toward one another and into engagement with a parison 27 which is fed between the molds by a nozzle 28 of the blow molding machine 10, all as is conventional with such molding equipment. A plurality of support rods 30 span the distance between the frames 12 and 14 and serve to tie the same together whereby to complete a rigid frame in the general nature of a box.

The frame is longitudinally reciprocable, by suitable driving mechanism along a pair of spaced tracks 32 whereby, during a given cycle of the machine the molds 24 may be shifted from engagement with one parison, where the blow molding operation has been completed, to engagement with another parison to commence the blow molding operation. In order to achieve such longitudinal shifting movement, the frame is provided with a plurality of wheels such as 34 which are in engagement with the tracks 32.

The support assembly 36 for use with the blow molding machine 10 is the same for each of the shiftable frames 12 and 14 and therefore only one of the assemblies 36 will be described hereinafter, it being appreciated that, in machines such as that chosen for illustration in the present embodiment, a pair of support assemblies 36 would be provided, one for each of the frame members 12 and 14.

The support assembly 36 has, as its major components, a rider bar 38, one end 40 of the rider bar 38 being connected to the shiftable platen 22, there being a wheel 42 at the other end 44 of the rider bar and a roller 46 carried by the frame 12 in underlying engagement with the bar 38 whereby to support the bar 38 as it is shifted with the platen 22 under the urging of piston and cylinder assembly 26.

The rider bar 38 is generally rectangular in configuration whereby to present a lower flat face 48, an upper flat face 50 and a pair of opposed flat sides 52 and 54, the faces 48 and 50 lying in parallel spaced-apart planes. The upper face 50 is in substantial alignment with a lower flat surface 56 of leg 20 of frame 12 whereby the wheel 42 may engage said surface 56 and ride therealong when the bar 38 and platen 22 are reciprocated, it being noted that the bar 38 lies in a generally horizontal plane while the platen 22 is in a generally vertical plane.

The one end 40 of the bar 38 is connected to the platen 22 by virtue of a pin 58 which passes through said one end 40 and is engaged by a pair of ears 60 which depend from the platen 22 all as is clearly shown in FIGS. 1 and 3 of the drawing. Thus it will be appreciated that as the platen 22 is shifted from the full line position of FIG. 1 to the dotted line position thereof, the bar 38 is caused to reciprocate in a generally horizontal plane by virtue of the connection between said one end 40 of the bar 38 and the ears 60 of the platen 22.

The roller 46 is carried by a pair of depending, spaced hangers 62 which hangers 62 are carried by a mounting bracket 64 which mounting bracket 64 is secured to frame 12 and more particularly surface 56 thereof as is best shown in FIG. 1, such securing being accomplished by virtue of suitable screws or bolts 66.

The mounting plate 64 also carries a pair of spaced-apart, depending guide rollers 68 and 70, each of said rollers being in engagement with a corresponding side of the bar 38 whereby to embrace the bar therebetween and guide the same as it is shifted with the platen in a generally rectilinear path It will be noted that the bar 38 passes between the hangers 62 and over roller 46, the lower face 48 of the bar being in engagement with and supported by the roller 46.

The other end 44 of the rider bar 38 is bifurcated as shown in FIG. 3 whereby to present a pair of arms 72, the wheel 42 being journaled between said arms as by a pin 76. It will be noted that wheel 42 is carried by rider bar 38 in such a manner that the wheel extends above the upper face 50 of the bar 38 whereby the same may freely engage surface 56 of the frame 12.

As is evident from the foregoing, when the blow molding machine 10 is in operation, the platen 22 is constantly being shifted between its full line position and dotted line position of FIG. 1 whereby to accomplish the molding of the parison. In order to permit ready access to the items which have been molded as well as to the face of the molds 24, it is desireable to eliminate any superfluous structure in the area between the molds 24. To accomplish this the support assembly hereinabove described is utilized to the end that the platens 22 are supported at their lowermost edges and there is no structure to interfere with access to that area of the machine between the molds 24, the molds being carried by piston and cylinder assemblies 26 and also by guide rods such as 78 which are connected to the platen 22 and pass through bearings in frames 12 and 14 but do not span the area between the molds 24. Thus, through the provision of the support assembly 36 a much more efficient operation can be achieved.

It will be appreciated that support assembly 36 operates to fully support platen 22 and its associated mold 24 and that, when the platen 22 is shifted the bar 38 will shift therewith, the bar being supported, along the lower face 48 thereof by the roller 46 which is in constant engagement with said face 48 as the bar is rectilinearly reciprocated, the other or free end 44 of the bar being supported by wheel 42 which is in constant engagement with the surface 56 of fixed frame 12. Lateral shifting movement of the bar 38 is precluded by the provision of guide rollers 68 and 70 which embrace the bar and retain the same tightly therebetween, such lateral shifting or swaying movement being further precluded by the fact that bar 38 extends between depending hangers 62 which carry the roller 46. Thus the bar is at all times maintained in a steady position and serves to, in effect, cantilever platen 22 in its dotted line position of FIG. 1 while yet precluding any lateral or swaying movement of the platen when it is so extended.

I claim:

1. In a blow molding machine having a fixed frame and at least one platen shiftable with respect to the frame, a support assembly for said platen comprising:

a rider bar having one end connected to said platen whereby said bar is shifted with said platen;

a wheel carried by the other end of the rider bar and in engagement with the frame; and a roller carried by said frame and disposed in underlying engagement with said bar, whereby to support the bar as it si shifted with the platen.

2. The invention as set forth in claim 1, said bar being shiftable in a generally horizontal plane, the platen being in a generally vertical plane.

3. The invention as set forth in claim 2, said bar having an upper face and a lower face, said wheel extending above said upper face and into engagement with the frame for movement therealong when the bar is shifted.

4. The invention as set forth in claim 3, said roller being in engagement with said lower face for movement therealong when the bar is shifted.

5. The invention as set forth in claim 4, said faces lying in parallel, spaced planes.

6. The invention as set forth in claim 5, said other end of the bar being bifurcated whereby to present a pair of arms, said wheel being rotatably carried between said arms.

7. The invention as set forth in claim 6, there being a pair of spaced guide rollers carried by said frame, each of said rollers being in engagement with a corresponding side of said rider bar for movement therealong when the bar is shifted.

8. The invention as set forth in claim 7, there being a pin extending through said one end of the rider bar whereby to connect the same with a pair of ears depending from the platen.

9. The invention as set forth in claim 8, said roller being carried by a pair of spaced hangers depending from said frame, said bar passing between said hangers and over said roller.

10. The invention as set forth in claim 9, there being a mounting bracket secured to said frame and carrying said guide rollers and said hanger.